United States Patent
Cleave et al.

(10) Patent No.: US 10,637,562 B1
(45) Date of Patent: Apr. 28, 2020

(54) GEOSYNCHRONOUS BROADCAST OF DATA TO LOW-EARTH ORBIT

(71) Applicant: Vector Launch Inc., Tucson, AZ (US)

(72) Inventors: Robert Randall Cleave, Half Moon Bay, CA (US); Shaun B. Coleman, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/412,670

(22) Filed: May 15, 2019

(51) Int. Cl.
H04B 7/19 (2006.01)
H04B 7/185 (2006.01)

(52) U.S. Cl.
CPC .......... *H04B 7/19* (2013.01); *H04B 7/18523* (2013.01)

(58) Field of Classification Search
CPC .......... H01Q 1/288; H01Q 3/26; H01Q 25/00; H04B 7/2041; B64G 1/66
USPC ........................................................ 342/354
See application file for complete search history.

(56) References Cited

U.S. PATENT DOCUMENTS

| | | | | |
|---|---|---|---|---|
| 6,088,571 | A * | 7/2000 | Kane | H04B 7/195 455/12.1 |
| 2015/0024677 | A1* | 1/2015 | Gopal | H04B 7/2041 455/13.1 |
| 2018/0062735 | A1* | 3/2018 | Gill | H04B 7/18519 |
| 2018/0343055 | A1* | 11/2018 | Olson | B64G 1/10 |
| 2019/0074893 | A1* | 3/2019 | Kaen | H04B 7/18521 |

* cited by examiner

*Primary Examiner* — Harry K Liu

(57) ABSTRACT

Systems, methods, and software described herein provide enhancements for deploying communication networks in clusters of satellite devices. In one example, satellite system may include a ground node including a geosynchronous communication interface configured to transmit data to a geosynchronous satellite device in a geosynchronous orbit, the geosynchronous satellite device including a ground communication interface configured to receive data from at least the ground node, and a low earth orbit communication interface configured to broadcast the data for receipt by a plurality of low-earth orbiting satellite devices. The plurality of low-earth orbiting satellite devices each may include a geosynchronous communication interface configured to receive the data broadcast by the geosynchronous satellite device.

16 Claims, 6 Drawing Sheets

US 10,637,562 B1

GEOSYNCHRONOUS BROADCAST OF DATA TO LOW-EARTH ORBIT

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. However, most satellites deployed in orbit comprise singular entities that are expensive to create and launch into orbit, especially for organizations that may not require the use of an entire satellite with a large number of sensors, or may not require continuous operations on the satellite. As a result, organizations may avoid the use of satellites, limiting the use of promising satellite technology.

OVERVIEW

Systems, methods, and software described herein provide enhancements for deploying communication networks in clusters of satellite devices. In one example, satellite system may include a ground node including a geosynchronous communication interface configured to transmit data to a geosynchronous satellite device in a geosynchronous orbit, the geosynchronous satellite device including a ground communication interface configured to receive data from at least the ground node, and a low earth orbit communication interface configured to broadcast the data for receipt by a plurality of low-earth orbiting satellite devices. The plurality of low-earth orbiting satellite devices each may include a geosynchronous communication interface configured to receive the data broadcast by the geosynchronous satellite device.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
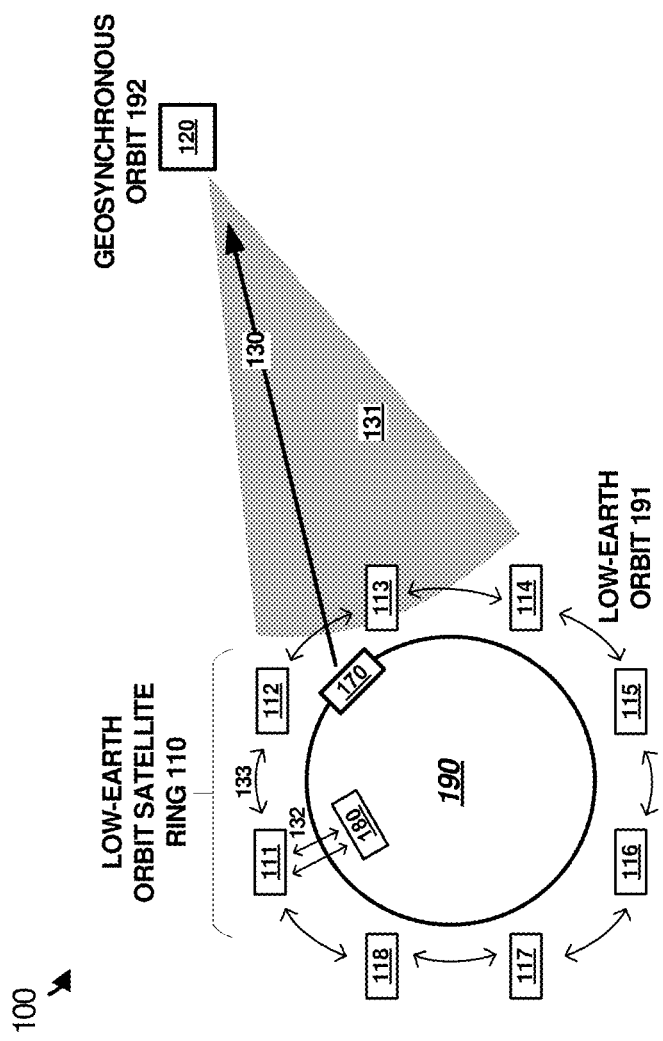
FIG. 1 illustrates a satellite platform according to an implementation.

The various examples disclosed herein provide enhancements for satellite hardware and software technology, as well as enhanced operation thereof. For example, a cluster of low-earth orbiting (LEO) satellite devices can be deployed into orbit using a launch system. These LEO satellite devices can comprise general-purpose satellite devices, such as CubeSat devices configured with processing systems, storage systems, and communication systems. These LEO satellite devices can also have specialized roles which can be defined according to provisioned hardware or software elements, or can be associated with a particular set of applications deployed to the associated satellites. In some examples, a multi-ring orbital arrangement of a plurality of LEO satellite devices is provided. This multi-ring orbital arrangement provides for enhanced communications, imaging coverage, redundancy, and fault-tolerance, among other operations. Pseudo-geosynchronous windows can be established by the LEO satellite platforms using passage through a virtual or logically-defined window to trigger specialized operations of the LEO satellite devices. Further examples include storage area networks (SAN) configurations where one or more LEO satellite devices can include storage systems used for deployment of virtual machine images, containers, differential state information, or other state information related to the execution of virtual nodes by one or more peer LEO satellite devices of the cluster.

Satellites can be deployed into various orbits, each corresponding to a particular orbital configuration. Low-earth orbits (LEO) typically comprise orbital altitudes of 2,000 kilometers (km) or less. Medium-earth orbits (MEO) typically comprise orbital altitudes of 2,000 km up to geosynchronous (GSO) orbital altitudes of 35,786 km. A geostationary orbit is a special case of a GSO corresponding to a geosynchronous orbit about the equator, and can be referred to as a geosynchronous equatorial orbit (GEO). However, for simplicity, both geostationary and geosynchronous orbits are referred to as GEO herein. Other orbital configurations are possible, which might have various inclinations and altitudes, such as equatorial and polar orbits. A satellite in polar orbit passes over the equator at a different longitude on each orbital cycle.

The examples disclosed herein provide systems and methods for deploying software applications in an orbiting satellite platform, wherein each of the software applications executes as a virtual node that can share resources with one or more other applications deployed to the same LEO satellite device. These virtual nodes may comprise full operating system virtual machines in some examples, and may further include virtual containers. These containers may include Docker containers, Linux containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host satellite device, the containers are provisioned to have private access to the operating system with their own identifier space, file system structure, and network interfaces.

In the present example, to provide the satellite platform, a plurality of Low-earth orbit satellite devices may be deployed, referred herein as LEO satellites or LEO satellite devices. Organizations may generate applications and deploy the applications to the LEO satellite devices to perform desired operations. These operations may include military and civilian observation operations, communications operations, navigation operations, weather operations, and research operations. Applications may be deployed in one or more LEO satellite devices of the orbiting satellite platform. In some implementations, the application may be provided to each of the one or more LEO satellites using a ground control system or ground communication system and at least one geosynchronous or geostationary orbit satellite, as an uplink to the one or more LEO satellites. In other implementations, an uplink may be made to a subset of the LEO satellites in the platform through the ground control system and the GEO satellite, wherein the LEO satellites are configured to distribute the application to other desired LEO satellites in the platform through in-plane communication (e.g. within the same orbital ring) or cross-plane communications (e.g. between orbital rings). Once deployed in the environment, the application may execute on the assigned LEO satellites. Though examples herein refer to the deployment of applications, implementations are not so limited and the deployed applications may instead be or also include other data such as virtual machine containers, virtual machines, virtual machine configuration data, virtual machine container data, container configuration data, virtual machine state information, or other virtual machine data for operating one or more virtual nodes on the LEO satellites.

In some implementations, the at least one GEO satellite may communicate with the LEO satellite devices using broadcast communications. For example, a GEO satellite may broadcast communications to the LEO satellites of the orbiting satellite platform by broadcasting the communications into an area of low-earth orbit including orbital paths of the LEO satellite devices of the orbiting satellite platform. In some examples, the broadcasts may utilize a unidirectional communication protocol without acknowledgement of receipt of the data by LEO satellite devices.

In some implementations, the LEO satellites of the satellite platform may each exchange state information with one or more other LEO satellites and the ground control system for the platform or other ground based devices or nodes. This state information may include current operational state information for each of the applications, such as the tasks or processes that are operating, and may further exchange data generated at least partially from the sensors of the satellite. This data may be used in a peer group (e.g. satellites of an orbital ring), wherein a first LEO satellite may identify a first set of data, and provide the data to a second LEO satellite. The second LEO satellite may then identify second data and, process the first and second data as defined by the application. This operation may be used, as an example, in imaging operations, wherein a first satellite may take images of an object over a first period of time, and provide data for the images to the second satellite. The second satellite may take subsequent images and use the data for the first images and the subsequent images to make a determination about an object. Although this is one example, it should be understood that other operations may use peer sharing of state data to identify characteristics about measured data from the satellite sensors.

As a first example satellite platform, FIG. 1 is shown. FIG. 1 illustrates a satellite environment 100 according to an implementation. Satellite environment 100 includes a low-earth orbit satellite platform with satellites 111-118 arranged in an orbital ring 110. Though not shown for simplicity, the low-earth orbit satellite platform may include additional satellites arranged in one or more other orbital rings. FIG. 1 also includes ground based nodes 170, ground control systems 180 and Earth 190.

LEO satellites 111-118 form an orbital ring and include an in-plane network arrangement for exchanging network communications among members of the orbital ring. The LEO satellites of each orbital rings can share an orbital distance from the surface of Earth 190, an orbital inclination, or and other orbital properties or metrics that can differentiate rings and form groupings of LEO satellites. LEO satellites 111-118 communicate over wireless network links 133 to form the in-plane network arrangement. In some examples, further wireless network links are included to couple communications among LEO satellites of separate orbital rings to form a cross-plane network arrangement. Ground based nodes 180 may communicate with satellites 111-118 using associated wireless communication links 132.

Ground control system 170 may communicate with geosynchronous orbiting satellite 120 in geosynchronous orbit 192 using associated wireless communication links 130. Though the satellite platform may include a plurality of GEO satellites, for simplicity, FIG. 1 includes a single GEO satellite. The GEO satellite 120 communicates with the LEO satellite devices using broadcast communications 131. As shown, the GEO satellite 120 may broadcast communications to the LEO satellite devices 111-118 of the orbiting satellite platform by broadcasting the communications into an area of low-earth orbit 191 including orbital paths of the LEO satellite devices 111-118 of the orbiting satellite platform. In some examples, the broadcasts may utilize a unidirectional communication protocol without acknowledgement of receipt of the data by LEO satellite devices. While implementations are not limited to a particular frequency range, some implementations may utilize a frequency range corresponding to a broadcast satellite service (BSS), a fixed-satellite service (FSS), a mobile-satellite service (MSS) or similar services for broadcast communications 131. While not shown, in some examples, the ground control system 170 may also communicate with the LEO satellites 111-118.

The plurality of satellites 111-118 may be launched and deployed as an orbiting platform for a plurality of different software application payloads. Ground control system 170 may initiate an uplink 130 with the GEO satellite 120 and provide software application payloads to the GEO satellite 120, as well as updates to any scheduling information for the LEO satellites 111-118. Once uploaded to the GEO satellite 120, the GEO satellite may begin broadcasting the information to the LEO satellites within the area of low-earth orbit that receives the broadcast communications 131. In some implementations, the GEO satellite 120 may solely provide the communications to the LEO satellites 111-118. In other implementations, the GEO satellite 120 may broadcast the communications to the LEO satellites within the area of low-earth orbit that receives the broadcast communications 131 and the receiving LEO satellites 120 may provide the received broadcast communications to the other LEO satellites through in-plane and cross-plane communications. In still other implementations, the system may utilize both or selectively use a distribution method. Once uploaded to the desired LEO satellites 111-118, the software application payloads may begin execution.

In some examples, the applications deployed to the LEO satellites 111-118 control the LEO satellites to perform desired operations. These operations may include military and civilian observation operations, communications operations, navigation operations, weather operations, and research operations. While performing the desired operations, the LEO satellites 111-118 may each exchange state information or other information with one or more other LEO satellites 111-118 using communication links 133 and with one or more ground based nodes 180 using communication links 132. The state information may include current operational state information for each of the applications, such as the tasks or processes that are operating, and may further exchange data generated at least partially from the sensors of the satellite. The information exchanged, for example, with the ground based nodes 180 may further include results of the operations of the LEO satellites 111-118.

In examples in which the broadcasts 131 from GEO satellite 120 are solely responsible for providing the applications to each intended LEO satellite, the GEO satellite may repeat the broadcast of the applications to the LEO satellites 111-118 to ensure receipt by the intended LEO satellites as the LEO satellites pass through the area of low-earth orbit that receives the broadcast communications 131.

In examples in which the LEO satellites distribute received broadcast communications through in-plane and/or cross-plane communications, the GEO satellite 120 may repeat the broadcasts until each orbital ring of LEO satellites has received sufficient broadcasts of an application (e.g. for distribution therein by in-plane communication). For example, the GEO satellite 120 may provide a first application to LEO satellite device 111 over link 131, wherein LEO satellite device 111 may, in turn supply the application to other LEO satellites in its orbital ring. For example, LEO satellite 111 may provide the application to LEO satellites 112 and 118 that neighbor LEO satellite 111 in the same orbital ring. LEO satellites 112 and 118 may forward the application to LEO satellites 113 and 117 and the process may repeat until each LEO satellite device of the orbital ring has received the application. In this manner, the LEO satellites 112-118 may provide operations of the application without directly receiving the communication from GEO satellite 120.

In cross-plane distribution examples, the GEO satellite 120 may repeat broadcasts until the LEO satellites of the platform as a whole have received sufficient broadcasts of an application (e.g. for distribution therein by in-plane and cross-plane communication). The LEO satellites may perform a similar distribution process to that above but also forward the application between orbital rings of LEO satellites using cross-plane communication links.

In addition, both of the above distribution processes may involve the sharing of portions of the application instead of the whole of the application. For example, where satellites of an orbital ring pass into and out of the area of low-earth orbit that receives the broadcast communications 131 before the whole of the application can be broadcast, the LEO satellites of each orbital ring may share the received portion of the application with two LEO satellites of the preceding and following orbital rings. Such cross plane sharing may be selectively performed to achieve the most efficient and cost effective distribution of the complete application and may be performed differently in different contexts and for applications with different priorities. Further, in some examples, the broadcasts 131 may include data from multiple applications and the LEO satellites may be configured to selectively forward portions of the received communications based on the intended destination of each portion.

Moreover, similar to providing the initial configuration to the LEO satellites, GEO satellite 120 may further be used to supply updates to each of the applications operating in the satellite platform, and may further update any scheduling information on each of the satellites using any of the above described distribution processes.

Figure 2:
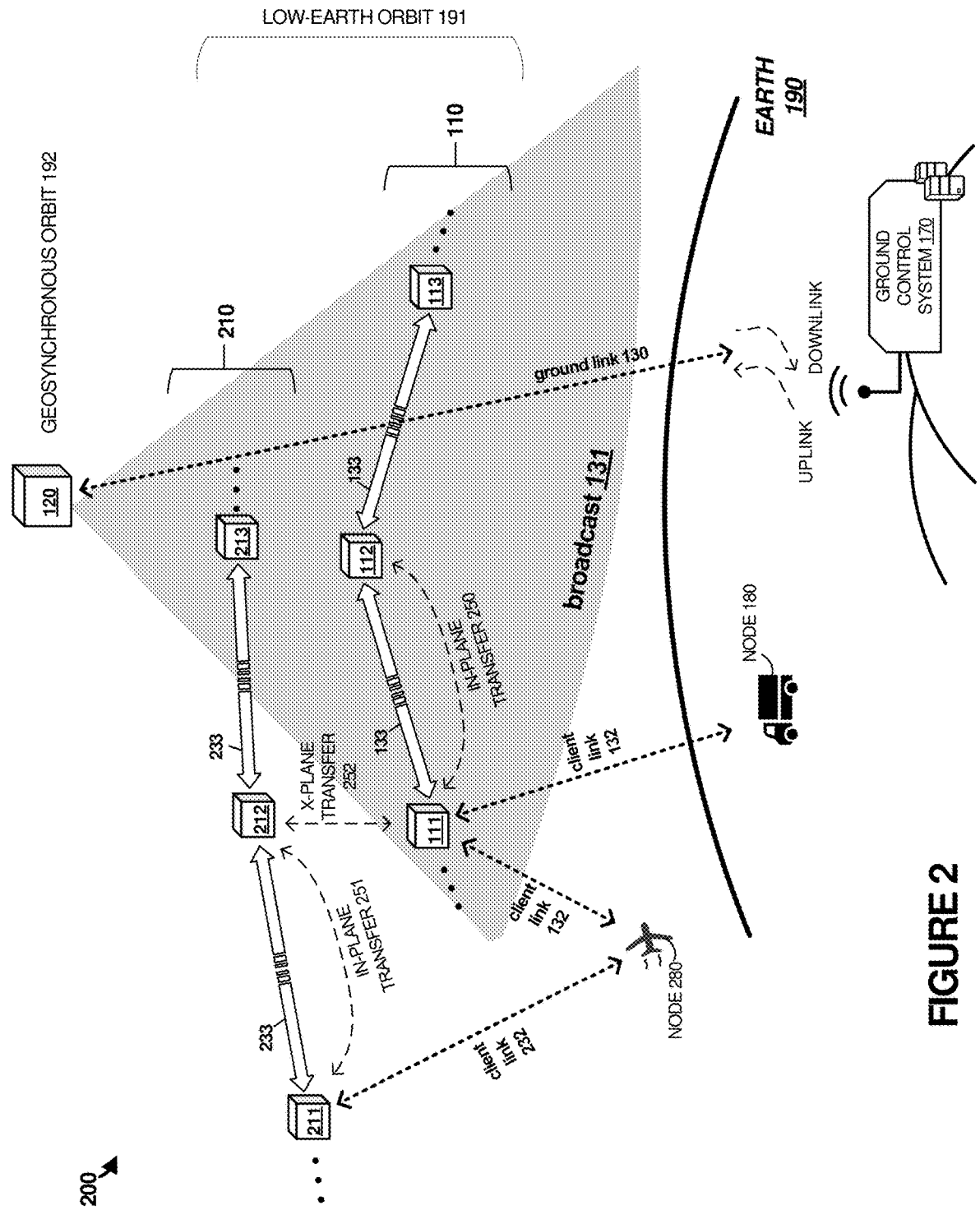
FIG. 2 illustrates a satellite platform according to an implementation.

FIG. 2 shows a second example satellite platform according to some implementations. FIG. 2 illustrates a satellite environment 200 according to an implementation. Satellite environment 200 includes a satellite cluster with a GEO satellite 120, LEO satellites 111-113 arranged in a first orbital ring 110, and LEO satellites 211-213 arranged in a second orbital ring 210. FIG. 2 also includes ground based nodes 180 and 280, ground control system 170 and Earth 190. LEO satellites 111-113 form a first orbital ring 110 and include a network arrangement for exchanging network communications among members of orbital ring 110 as in-plane transfers 250. LEO satellites 211-213 form a second orbital ring 210 and include a network arrangement for exchanging network communications among members of orbital ring 210 as in-plane transfers 251. The LEO satellites of each orbital ring can share an orbital distance from the surface of Earth 190, an orbital inclination, or other orbital properties or metrics which may differ between orbital rings and differentiate the LEO satellites of different orbital rings. LEO satellites 111-113 communicate over wireless network links 133 and LEO satellites 211-213 communicate over wireless network links 233. In some examples, further wireless network links 252 are included to couple communications among orbital rings 110 and 210.

Ground control system 170 may communicate with GEO satellite 120 using an associated wireless communication link, ground link 130. The GEO satellite 120 communicates with the LEO satellite devices 111-113 and 211-213 using broadcast communications 131. As shown, the GEO satellite 120 may broadcast communications to the LEO satellite devices 111-113 and 211-213 of the orbiting satellite platform by broadcasting the communications into an area of low-earth orbit 191 including orbital paths of the LEO satellite devices 111-113 and 211-213 of the orbiting satellite platform. In some examples, the broadcasts 131 may utilize a unidirectional communication protocol without acknowledgement of receipt of the data by LEO satellites 111-113 and 211-213.

In an example, GEO satellite 120 may receive an application through the ground link 130 from the ground control system 170. GEO satellite 120 then may repeatedly broadcast the received application for a determined amount of time.

Where cross-plane distribution is not used, GEO satellite 120 may repeatedly broadcast the application to the LEO satellites until each orbital ring of having a destination LEO satellite has received sufficient broadcasts of the application. For example, the GEO satellite 120 may provide a first application to LEO satellite devices 111 and 211 through the broadcasts 131. LEO satellite devices 111 and 211 may initiate a distribution of the received first application to other LEO satellites in their respective rings using in-plane transfers 250 and 251, respectively.

In cross-plane distribution examples, GEO satellite 120 may repeat broadcasts until the LEO satellites of the platform as a whole have received sufficient broadcasts of an application (e.g. for distribution therein by in-plane and cross-plane communication). The LEO satellites may perform a similar distribution process to that above but also forward the application between orbital rings of LEO satellites using cross-plane transfers 252.

Further as described above, both of the above distribution processes may involve the sharing of portions of the application instead of the whole of the application. For example, where LEO satellites of an orbital ring pass into and out of the area of low-earth orbit that receives the broadcast communications 131 before the whole of the application can be broadcast, the LEO satellites of each orbital ring 110 and 210 may share the received portion of the application with LEO satellites of the preceding and following orbital rings. Such cross-plane sharing 252 may be selectively performed to achieve the most efficient and cost-effective distribution of the complete application and may be performed differently in different contexts and for applications with different priorities.

Regardless of the particular distribution process, each LEO satellite, upon receiving a communication, may forward the packet according to the particular distribution process and determine whether it is an intended recipient. If the LEO satellite is an intended recipient, the LEO satellite may consume the communication; otherwise, the communication may be discarded or partially discarded if a portion of the communication is intended for the LEO satellite.

Once the LEO satellites have received and configured the application, GEO satellite 120 may be used to supply updates to each of the applications operating in the satellite platform. For example, the GEO 120 satellite may supply updates using the same or a similar process. The GEO satellite 120 may further update any scheduling information on each of the LEO satellites 111-113 and 211-213 using any of the above described distribution processes.

In some examples, the applications deployed to the LEO satellites 111-113 and 211-213 control the LEO satellites to perform desired operations. These operations may include military and civilian observation operations, communications operations, navigation operations, weather operations, and research operations. While performing the desired operations, the LEO satellites 111-113 and 211-213 may each exchange state information or other information with one or more other LEO satellites 111-113 and 211-213 using communication links 250-252 and with one or more ground based nodes 180 and 280. The state information may include current operational state information for each of the applications, such as the tasks or processes that are operating, and may further exchange data generated at least partially from the sensors of the satellite. This data may be used by a group of LEO satellites, wherein a first LEO satellite may identify a first set of data and provide the data to a second LEO satellite. The second LEO satellite may then identify second data and process the first and second data as defined by the application. As an example, in imaging operations, a first LEO satellite may take images of an object over a first period of time and provide data for the images to the second satellite. The second satellite may take subsequent images and use the data for the first images and the subsequent images to make a determination about an object. The result of the determination, along with any other desired information, may then be relayed to one or more ground based nodes 180 and 280. In some examples, the receiving ground based nodes may be associated with an organization that deployed or requested deployment of the application to the LEO satellites. Although this is one example, it should be understood that other operations may use peer sharing of state data to identify characteristics about measured data from the satellite sensors.

Figure 3:
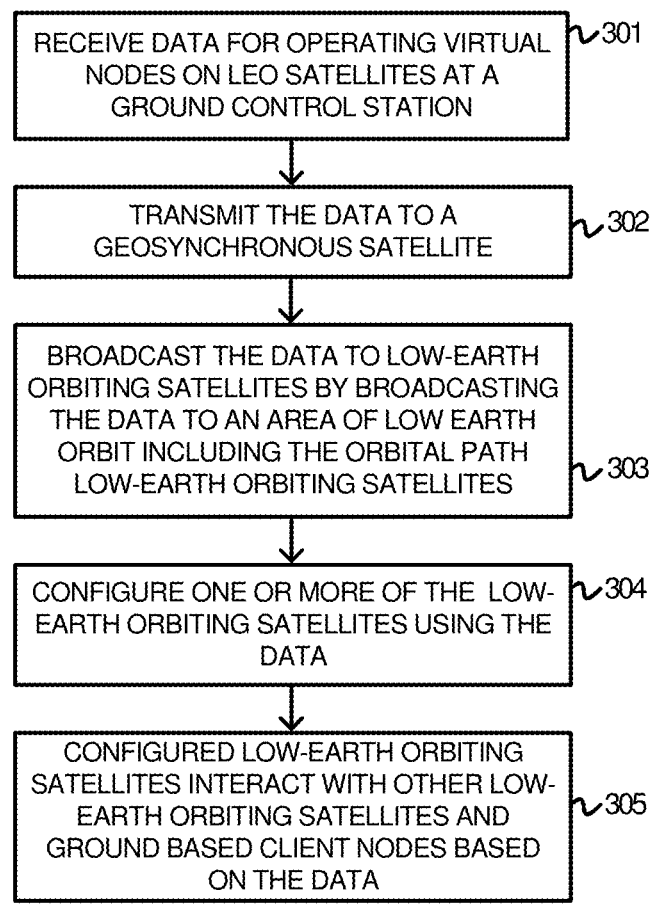
FIG. 3 illustrates operations of satellites according to an implementation.

FIG. 3 is a flow diagram illustrating example operations of the satellite platform of FIG. 1. In FIG. 3, a ground control station may receive (301) data for operating virtual nodes on one or more LEO satellites and transmit (302) the data to the GEO satellite. The GEO satellite may then broadcast (303) the data to a plurality of low-earth orbiting satellites by broadcasting the data to an area of low earth orbit including the orbital path of the plurality of low-earth orbiting satellites. One or more LEO satellites may use the data to configure (304) the operations of a virtual node present on the one or more LEO satellites. The configured LEO satellites (305) may then interact with other low-earth orbiting satellites and ground based client nodes based on the data.

Figure 4:
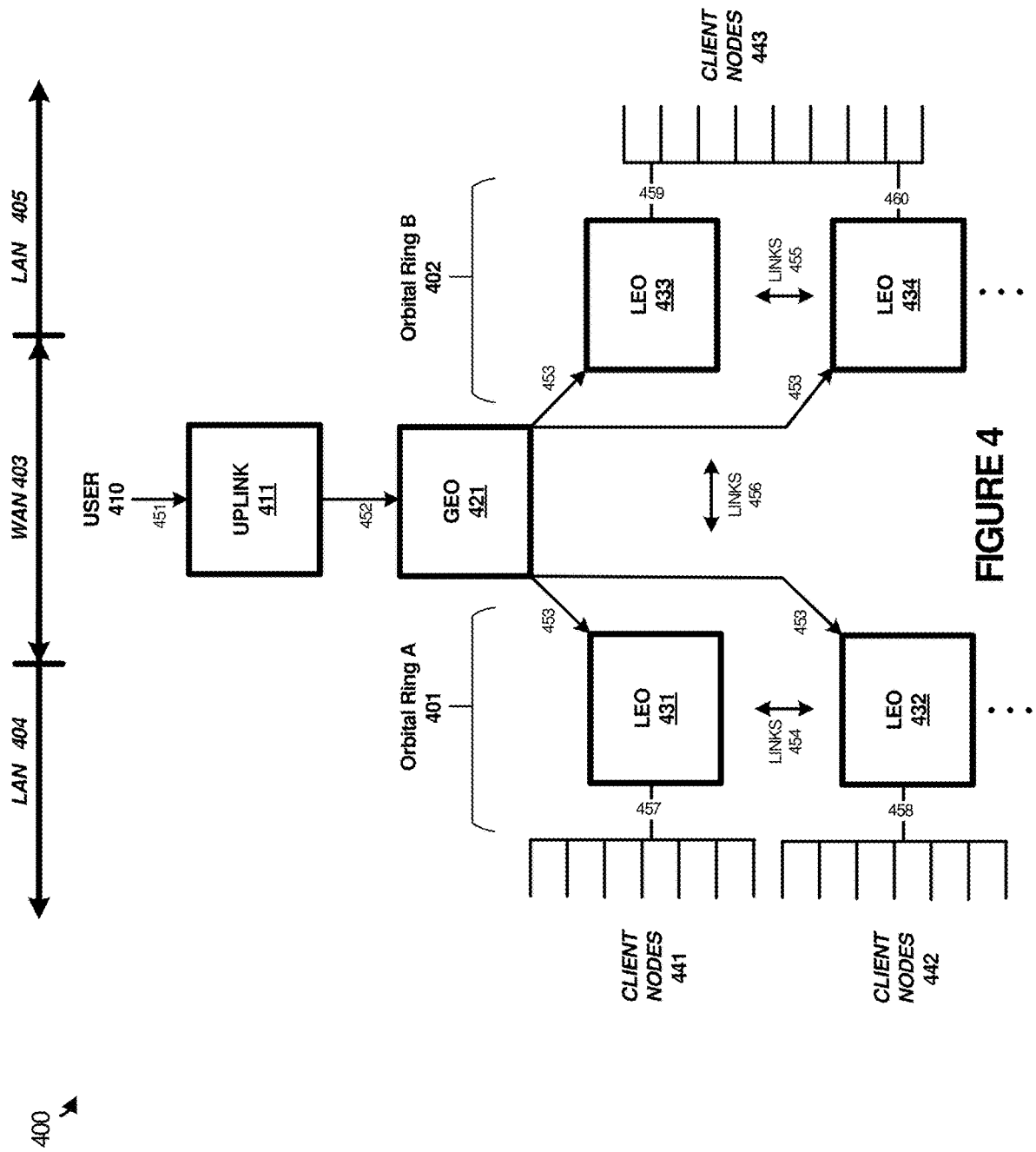
FIG. 4 is a block diagram illustrating a networking arrangement among devices of a satellite platform according to an implementation.

FIG. 4 is a block diagram illustrating a networking arrangement among devices of the satellite platform 400, according to some implementations. Satellite platform 400 includes a user 410, and uplink 411 of a ground control system, a GEO satellite 421, LEO satellites 431-432 of an orbital ring A 401, LEO satellites 433-434 of an orbital ring B 402, and client nodes 441-443 of the LEO satellites 431-434.

The networking arrangement of the satellite platform 400 is divided into a wide area network portion (WAN) 403 and two local area networks portions (LANs) 404 and 405.

The WAN portion 403 includes a link 451 from the user 410 to the ground control uplink 411, a link 452 from uplink 411 to GEO satellite 421 and broadcast link 453 from GEO satellite 421 to the LEO satellites 431-434. Once received by the LEO satellites 431-434, the communications travel through LANs 404-405.

LAN 404 is illustrated as an example in which the LEO satellites do not share the same set of ground-based client nodes, for example, because each is performing a different task. LEO satellites 431 and 432 may share the communications received from GEO satellite 421 within LAN 404 over communication link 454, share the communication received from GEO satellite 421 using communication link 456, and/or consume the communication for use in the respective satellite's own operation. Once configured, the LEO satellites 431-432 can operate based on the configuration, and, as appropriate, interact with a respective set of client nodes 441 or 442 over links 457-458. LAN 404 can include communication link 454, while communication link 456 comprises a link within WAN 403. However, it should be understood that LAN 404 might instead include portions of both communication links 454 and 456.

LAN 405 operates in a similar manner to LAN 404 with exception that LAN 406 includes shared client nodes 443 over links 459-460. Such a situation may occur when the LAN satellites are both assigned to the same task, respective portions of a larger task, etc. For example, a continuous analysis may be requested of the satellites of LAN 405 with continuous reporting to client nodes 442. LEO satellites 433 and 434 may share the communications received from GEO satellite 421 within LAN 405 over communication link 455, share the communication received from GEO satellite 421 using communication link 456, and consume the communication for use in the respective satellite's own operation. Once configured, LEO satellites 433 may initiate the analysis and report the results to client nodes 443. As the LEO satellites 433 and 434 travel along their shared orbit, the LEO satellite 433 may leave the area in which it can communicate with the client nodes 443. Before or at this time, the LEO satellite 433 may provide the current state of the analysis to LEO satellite 434. In turn, LEO satellite 434 may continue the analysis and reporting. LAN 405 can include communication link 455, while communication link 456 comprises a link within WAN 403. However, it should be understood that LAN 405 might instead include portions of both communication links 455 and 456.

Links 451-460 each comprise one or more communication pathways for exchanging network communications.

Links 451-460 can comprise radio frequency (RF) communication links or optical communication links. RF communication links include radio, microwave, and terahertz communication links. Optical communication links include infrared, laser, visual light, and ultraviolet communication links. Other portions of the electromagnetic spectrum can be employed, including combinations thereof. Links 451-460 can each comprise various logical, physical, or application programming interfaces. Example links can use optical, air, space, or some other element as the transport media. Link 451 may also include a wired transport media. Links 451-460 can each use various protocols and formats, such as Internet Protocol (IP), Ethernet, transmission control protocol (TCP), User Datagram Protocol (UDP), WiFi, Bluetooth, other wireless data interfaces, or some other communication format, including combinations, improvements, or variations thereof. Links 451-460 can each include direct links or may include intermediate networks, systems, or devices, and can include a logical network link transported over multiple physical links. Links 451-460 can each include routers, switches, bridges, traffic handling nodes, and the like for transporting traffic among endpoints.

Though each orbital ring is illustrated as having a corresponding LAN, implementations are not so limited. In other examples, multiple orbital rings may be included into a LAN (e.g. three neighboring rings) or all orbital rings may be a single LAN in which cross plane communications are used to form a mesh network.

Figure 5:
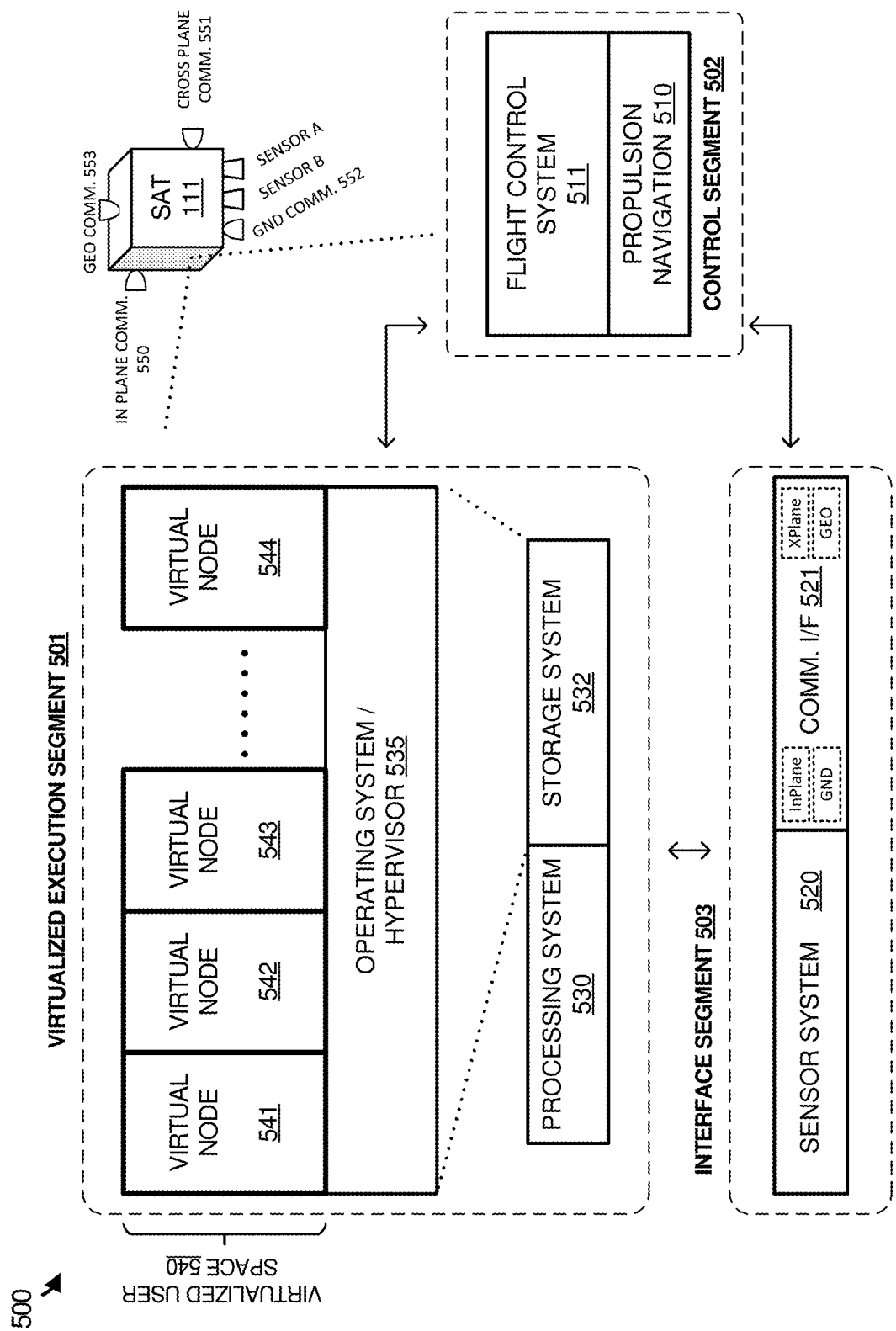
FIG. 5 illustrates an expanded view of an exemplary LEO satellite device capable of providing a platform for virtual nodes according to an implementation.

FIG. 5 illustrates an expanded view 500 of an exemplary LEO satellite device 111 capable of providing a platform for virtual nodes according to an implementation. Any of satellites 111-118 and 211-213 can include similar features, and satellite device 111 is included as representative of any LEO satellite device or similar device. Satellite device 111 includes virtualized execution segment 501, control segment 502, and interface segment 503, which may be coupled using various communication links. Virtualized execution segment 501 is representative of a virtualized execution system, which includes a virtualized user space 540 for virtual nodes 541-544, an operating system or hypervisor 535, a storage system 532 to store the operating system and virtual user space, and a processing system 530. Control segment 502 further includes flight control system 511 and propulsion navigation 510. Interface segment 503 further includes user sensor system 520 and communication interface 521, wherein communication interface 521 may be used for communications, particularly to control the hardware associated with in-plane communications 550, cross-plane communications 551, ground (gnd) communication 552 and GEO satellite communication 553.

Sensor system 520 may include one or more sensor devices, including imaging sensors, temperature sensors, light sensors, signal quality sensors, or some other similar sensor capable of interaction with virtual nodes 541-544. In FIG. 5, sensors 'A' and 'B' are shown as illustrative of downward-facing sensors. It should be understood that other sensors can be included, such as star sensors, space imaging sensors, radiation detectors, or other sensors.

As described herein, organizations may generate applications that are capable of being deployed as virtual nodes on one or more satellites of a satellite platform. These applications may be provided from a ground control system, or may be provided from another satellite via communication interface 521 on satellite device 111. Once the applications are provided, operating system/hypervisor 535, which is stored on storage system 532 and executed by processing system 530 may provide a platform for the execution of the applications. Here, each application provided to satellite device 111 is executed as a separate virtual node in virtual nodes 541-544, wherein the virtual nodes may comprise full operating system virtual machines or containers capable of sharing resources from the underlying operating system in storage system 532.

To manage the execution of the virtual nodes, operating system/hypervisor 535 may manage a schedule that is used to allocate processing resources of processing system 530 to each of the nodes, user sensors 520 to each of the nodes, and other similar resources on satellite device 111. In particular, the schedule may be used to ensure that each application is scheduled to receive processing resources from processing system 530 during defined time periods, and receive access to user sensors 520 during defined time periods. In some implementations, one or more of the applications may execute during the same time period on satellite device 111. These applications may use different sensors in user sensors 520, may time share the use of sensors in user sensors 520, or may use the same data from user sensors 520 in their operation. To allocate the sensors operating system 535 may be responsible for providing each operating virtual node with a communication link to the required user sensor, and deallocating or removing the communication link to the required sensor based on the scheduling. For example, an imaging device may be accessed by virtual node 541 during a first time period, wherein virtual node 541 may access the sensor based on addressing information provided by operating system 535. Once the time period expires, operating system 535 may prevent virtual node 541 from accessing the sensor, in some examples, by removing the addressing access of the virtual node, and allocating access of the sensor to a second virtual node.

In addition to the virtual node operations provided in virtualized execution segment 501, satellite device 111 further includes control segment 502. Control segment 502, which may be communicatively linked to virtualized execution segment 501 and interface segment 503, is responsible for logistical control elements of the satellite device 111. These operations may include managing the deployment of solar panels on the satellite, managing the positioning of the satellite with regards to the Earth or the Sun, or any other similar operation. In at least one example, flight control system 511 may monitor for requests from operating system 535, and determine whether the satellite is capable of accommodating the request from operating system 535. For example, virtual node 541 may generate a request to move a user sensor, which also requires movement using propulsion and navigation 510. In response to the request, flight control system 511 may determine that the movement cannot be made, and may prevent the movement of the satellite using propulsion and navigation 510. Further, in some implementations, flight control system 511, may provide a notification to operating system 535 and virtual node 541 indicating that the movement is not permitted.

Although illustrated as a separate system in the example of FIG. 5, it should be understood that in some examples, flight control system may be implemented and stored on processing system 530 and storage system 532. However, it should also be understood that flight control system may be stored on a separate storage system and use a different processing system than operating system 535 and its corresponding virtual nodes.

Figure 6:
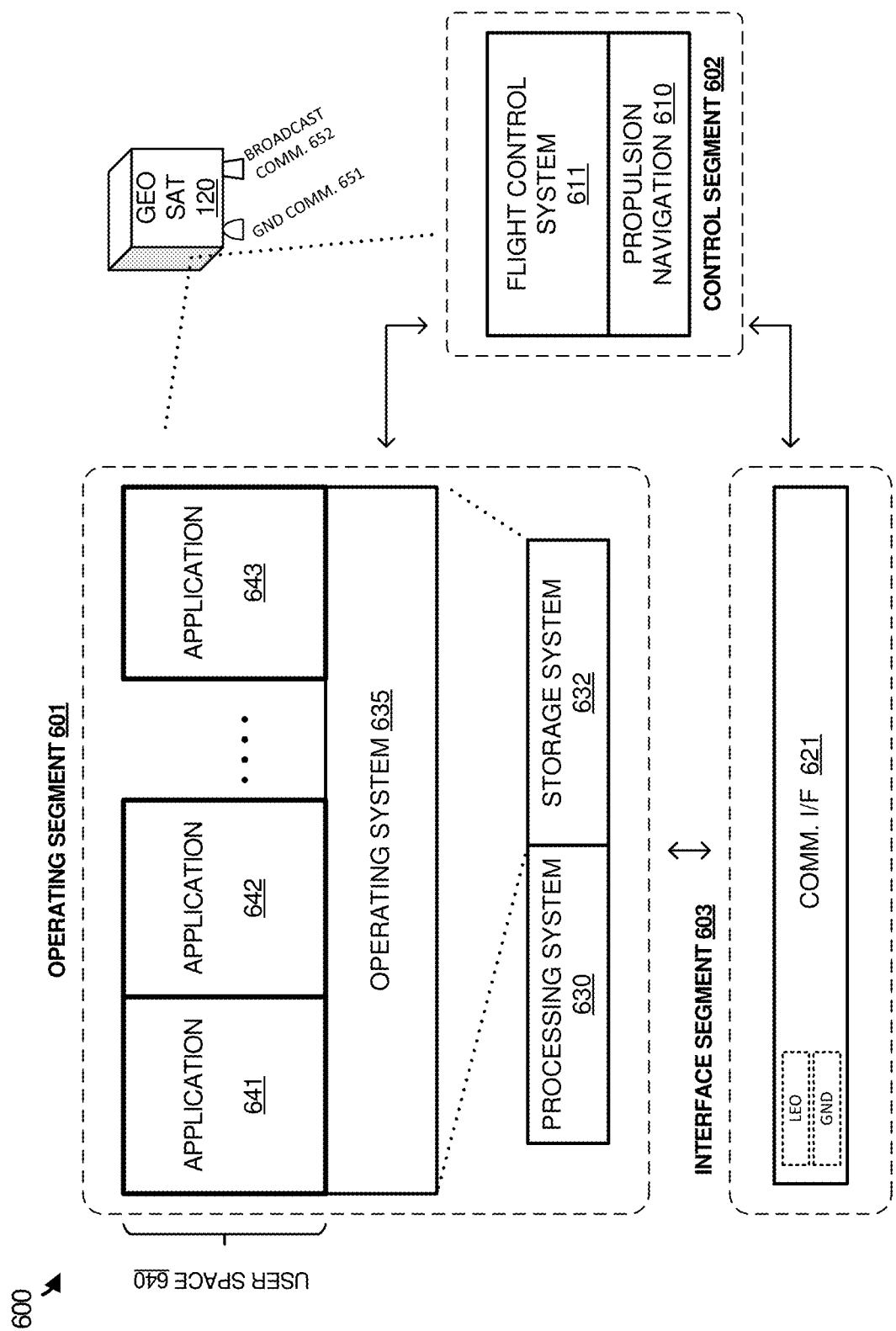
FIG. 6 illustrates an expanded view of an exemplary GEO satellite device capable of providing a platform for distributing applications and other data to LEO satellites according to an implementation.

FIG. 6 illustrates an expanded view 600 of an exemplary GEO satellite device 120 capable of providing a platform for distributing applications and other data to LEO satellites according to an implementation. Any of the GEO satellites discussed herein can include similar features, and GEO satellite device 120 is included as representative of any GEO satellite device or similar device. GEO satellite device 120 includes operating segment 601, control segment 602, and interface segment 603, which may be coupled using various communication links. Operating segment 601 is representative of an execution environment, which includes a user space 640 for applications 641-643, an operating system 635, a storage system 632 to store the operating system and user space, and a processing system 630. Control segment 602 further includes flight control system 611 and propulsion navigation 610. Interface segment 603 further includes communication interface 621, wherein communication interface 621 may be used for communications, particularly to control the hardware associated with ground (gnd) communication 651 and broadcast communication 652.

As described herein, organizations may generate applications that are capable of being deployed as virtual nodes on one or more LEO satellites of a satellite platform. These applications may be provided from a ground control system to the GEO satellite 620 via the ground communication interface 651 and provided to one or more LEO satellites using the broadcast communication interface 652. Once the applications are received from the ground control system, the operating system and applications, which is stored on storage system 632 and executed by processing system 630 may control the broadcast of the data such that intended LEO satellites of the satellite platform receive the data, either directly through the broadcast or by sharing via inter-LEO satellite transfer. For example, the GEO satellite may selectively choose which of multiple data sets to broadcast during a period of time based on which LEO satellites are currently within the area of low earth orbit that receives the broadcast. The selected data set may be paused or resumed as intended satellites enter and leave the reception area.

In addition, satellite device 120 further includes control segment 602. Control segment 602, which may be communicatively linked to operating segment 601 and interface segment 603, is responsible for logistical control elements of the satellite device 120. These operations may include managing the deployment of solar panels on the satellite, managing the positioning of the satellite with regards to the Earth or the Sun, or any other similar operation. In at least one example, flight control system 611 may monitor for requests from operating system 635, and determine whether the satellite is capable of accommodating the request from operating system 635.

Although illustrated as a separate system in the example of FIG. 6, it should be understood that in some examples, flight control system may be implemented and stored on processing system 630 and storage system 632. However, it should also be understood that flight control system may be stored on a separate storage system and use a different processing system than operating system 635 and its applications.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of satellite communication, the method comprising:
   receiving data in a first communication interface of a geosynchronous satellite device from a ground-based node;
   in a second communication interface of the geosynchronous satellite device, broadcasting the data for receipt by a plurality of low-earth orbiting satellite devices by at least broadcasting the data to an area of low earth orbit including an orbital path of the plurality of low-earth orbiting satellite devices; and
   wherein the broadcast of the data is received by a particular low-earth orbiting satellite device of the plurality of low-earth orbiting satellite device by receiving a first portion of the data from the geosynchronous satellite device while in the area of low earth orbit and receiving a second portion of the data from another low-earth orbiting satellite device using at least one among cross-plane communications and in-plane communications.

2. The method of claim 1, wherein responsive to receipt of the data, at least one of the plurality of low-earth orbiting satellite devices operates one or more virtual nodes in accordance with the data.

3. The method of claim 1, wherein the plurality of low-earth orbiting satellite devices include:
   a first ring of the low-earth orbiting satellite devices that share a first orbit communicating within the first ring using in-plane communication;
   a second ring of the low-earth orbiting satellite devices that share a second orbit communicating within the second ring using in-plane communication; and
   wherein one or more low-earth orbiting satellite devices of the first ring communicate at least a portion of the data received from the geosynchronous satellite device to one or more low-earth orbiting satellite devices of the second ring using corresponding cross-plane communications.

4. The method of claim 1, wherein the broadcasting of the data for receipt by the plurality of low-earth orbiting satellite devices comprises a unidirectional communication protocol without acknowledgement of receipt of the data by the plurality of low-earth orbiting satellite devices.

5. The method of claim 1, wherein the broadcasting is performed using a frequency range corresponding to a broadcast satellite service (BSS).

6. The method of claim 1, wherein the data comprises at least one of an application, container data, configuration data, state information, or virtual machine data for operating one or more virtual nodes on one or more of the plurality of low-earth orbiting satellite devices.

7. A satellite system comprising:
   a ground node comprising a geosynchronous communication interface configured to transmit data to a geosynchronous satellite device in a geosynchronous orbit;
   the geosynchronous satellite device comprising a ground communication interface configured to receive data from at least the ground node, and a low earth orbit communication interface configured to broadcast the data for receipt by a plurality of low-earth orbiting satellite devices by at least broadcasting the data to an area of low earth orbit including an orbital path of the plurality of low-earth orbiting satellite devices; and the plurality of low-earth orbiting satellite devices each comprising a geosynchronous communication interface configured to receive the data broadcast by the geosynchronous satellite device, wherein a first portion of the data is received by a first low-earth orbiting satellite device from the geosynchronous satellite device while in the area of low earth orbit, and wherein a second portion of the data is received from another low-earth orbiting satellite device in a same or different orbital ring as the first low-earth orbiting satellite device.

8. The satellite system of claim 7, comprising:
responsive to receipt of the data, at least one of the plurality of low-earth orbiting satellite devices configured to operate one or more virtual nodes in accordance with the data.

9. The satellite system of claim 7, wherein the plurality of low-earth orbiting satellite devices further comprise:
a first ring of the low-earth orbiting satellite devices sharing a first orbit and communicating within the first ring using in-plane communication;
a second ring of the low-earth orbiting satellite devices sharing a second orbit and communicating within the second ring using in-plane communication; and
wherein one or more low-earth orbiting satellite devices of the first ring communicate with one or more low-earth orbiting satellite devices of the second ring using corresponding cross-plane communications.

10. The satellite system of claim 7, wherein broadcasting of the data for receipt by the plurality of low-earth orbiting satellite devices comprises a unidirectional communication protocol without acknowledgement of receipt of the data by the plurality of low-earth orbiting satellite devices.

11. The satellite system of claim 7, wherein the broadcasting is performed using a frequency range corresponding to a broadcast satellite service (BSS).

12. The satellite system of claim 7, wherein the data comprises at least one of an application, container data, configuration data, state information, or virtual machine data for operating one or more virtual nodes on one or more of the plurality of low-earth orbiting satellite devices.

13. A geosynchronous satellite device comprising:
a ground communication interface configured to receive virtual machine configuration data from a ground node; and
a broadcast communication interface configured to broadcast the virtual machine configuration data to a plurality of low-earth orbiting satellite devices by at least broadcasting the virtual machine configuration data to an area of low earth orbit including an orbital path of the plurality of low-earth orbiting satellite devices using a unidirectional communication protocol without acknowledgement of receipt by the plurality of low-earth orbiting satellite devices;
wherein a first portion of the virtual machine configuration data is received by a first low-earth orbiting satellite device from the geosynchronous satellite device while in the area of low earth orbit;
wherein a second portion of the virtual machine configuration data is received from another low-earth orbiting satellite device using at least one among cross-plane communications and in-plane communications; and wherein the virtual machine configuration data comprises at least one of an application, container data, state data, state information, or virtual machines for operating one or more virtual machines on one or more of the plurality of low-earth orbiting satellite devices.

14. The geosynchronous satellite device of claim 13, comprising:
the broadcast communication interface configured to broadcast the virtual machine configuration data the plurality of low-earth orbiting satellite devices using a frequency range corresponding to a broadcast satellite service (BSS).

15. A method of satellite communication, the method comprising:
receiving data in a geosynchronous satellite device from a ground-based node; and
broadcasting the data for receipt by a plurality of low-earth orbiting satellite devices;
wherein the plurality of low-earth orbiting satellite devices include:
a first ring of the low-earth orbiting satellite devices that share a first orbit communicating within the first ring using in-plane communication;
a second ring of the low-earth orbiting satellite devices that share a second orbit communicating within the second ring using in-plane communication; and
wherein one or more low-earth orbiting satellite devices of the first ring communicate at least a portion of the data received from the geosynchronous satellite device to one or more low-earth orbiting satellite devices of the second ring using corresponding cross-plane communications.

16. A satellite system comprising:
a ground node comprising a geosynchronous communication interface configured to transmit data to a geosynchronous satellite device in a geosynchronous orbit;
the geosynchronous satellite device comprising a ground communication interface configured to receive data from at least the ground node, and a low earth orbit communication interface configured to broadcast the data for receipt by a plurality of low-earth orbiting satellite devices;
the plurality of low-earth orbiting satellite devices each comprising a geosynchronous communication interface configured to receive the data broadcast by the geosynchronous satellite device; and
wherein the plurality of low-earth orbiting satellite devices further comprise:
a first ring of the low-earth orbiting satellite devices sharing a first orbit and communicating within the first ring using in-plane communication;
a second ring of the low-earth orbiting satellite devices sharing a second orbit and communicating within the second ring using in-plane communication; and
wherein one or more low-earth orbiting satellite devices of the first ring communicate with one or more low-earth orbiting satellite devices of the second ring using corresponding cross-plane communications.

* * * * *